United States Patent [19]

Kawamura et al.

[11] 4,366,272
[45] Dec. 28, 1982

[54] METHOD FOR RECOVERING SYNTHETIC RESIN EMULSION

[75] Inventors: Sukeyoshi Kawamura, Tokai; Koichi Shimizu, Aichi; Yasuhiro Shikimori, Nagoya, all of Japan

[73] Assignee: Japan Acrylic Chemical Co. Ltd., Tokyo, Japan

[21] Appl. No.: 274,161

[22] Filed: Jun. 16, 1981

[30] Foreign Application Priority Data

Jun. 17, 1980 [JP] Japan .................. 55-82436

[51] Int. Cl.³ ............................................ C08J 11/04
[52] U.S. Cl. .................................. 523/335; 523/343; 528/485
[58] Field of Search ........ 260/2.3, 29.6 PM, 29.6 PT; 528/485; 523/335, 343

[56] References Cited

U.S. PATENT DOCUMENTS 3,520,860  7/1970  Bon .................................. 260/821

OTHER PUBLICATIONS

Rosen and Goldsmith, "Systematic Analysis of Surface Active Agents", second Ed., Wiley-Interscience, N.Y., 1972, p. 496.

Primary Examiner—Joseph L. Schofer
Assistant Examiner—Bernard Lipman
Attorney, Agent, or Firm—Cooper, Dunham, Clark, Griffin & Moran

[57] ABSTRACT

Synthetic resin emulsion is effectively recovered from waste water containing said synthetic resin emulsion by a method which comprises; adding coagulant to waste water containing synthetic resin emulsion to coagulate said synthetic resin emulsion, separating the coagulation of said synthetic resin emulsion from said waste water, and redispersing said separated coagulation in medium such as water or another synthetic resin emulsion by using water soluble polymer as dispersant.

3 Claims, 2 Drawing Figures

METHOD FOR RECOVERING SYNTHETIC RESIN EMULSION

BACKGROUND OF THE INVENTION

1. Field of the Invention

The invention relates a method for recovering synthetic resin emulsion.

More particularly, the invention relates a method for recovering synthetic resin emulsion which comprises; adding coagulant to waste water containing synthetic resin emulsion to coagulate said synthetic resin emulsion, separating the coagulation of said synthetic resin emulsion from said waste water, and redispersing said separated coagulation in medium such as water or another synthetic resin emulsion by using water soluble polymer as dispersant.

2. Description of the Prior Art

Waste water containing synthetic resin emulsion from plant should be exhausted after synthetic resin emulsion component is removed for preventing environmental pollution.

Hitherto, coagulation method has been generally employed to remove said synthetic resin emulsion from said waste water. In said coagulation method, the synthetic resin emulsion is removed in the form of coagulation by adding coagulant to the waste water. Said coagulation separated from the waste water has been mostly buried in the ground and on effective re-using measures has been founded.

SUMMARY OF THE INVENTION

Accordingly, an object of the present invention is to provide a new method for recovering synthetic resin emulsion which is removed from waste water.

Further object of the present invention is to re-use advantageously said recovered synthetic resin emulsion.

Still further object of the present invention is to dissolve indirect environmental pollution without burying coagulation of synthetic resin emulsion in the ground.

BRIEF DESCRIPTION OF THE DRAWINGS

The drawings illustrate a preferred embodiment of the separator used in the invention.

DETAILED DESCRIPTION

Figure 1:
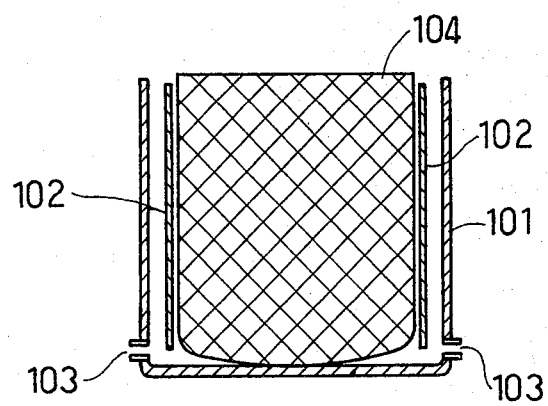
FIG. 1 is a sectional side view of said separator.

The method for recovering synthetic resin emulsion of the invention comprises; adding coagulant to waste water containing synthetic resin emulsion to coagulate said synthetic resin emulsion, separating the coagulation of said synthetic resin emulsion from said waste water, and redispersing said separated coagulation in medium such as water or another synthetic resin emulsion by using water soluble polymer as dispersant.

Synthetic resin emulsion as objects in the invention includes every kind of emulsion of synthetic resin and every kind of latex of synthetic rubber. Said synthetic resin emulsions are such as polyvinyl acetate emulsion, polyacrylate emulsions, polyvinyl chloride emulsion, polyethylene emulsion, polypropylene emulsion and ethylene-vinyl acetate copolymer emulsion, and the like; and said synthetic rubber lateces are such as styrenebutadiene rubber latex, acrylonitrile-butadiene rubber latex, chloroprene latex, isoprene latex and the like, and of course natural rubber latex is one of the objects in the invention.

The waste water in the invention is mainly washing water which is used for washing reactors, mixing vessels, storing containers, treating tanks and the like and such washing water is produced in the synthetic resin emulsion manufacturing plants or other plants handling the synthetic resin emulsion.

Said washing water generally contains 0.1 to 2% of synthetic resin component.

In the first step, coagulant is added to the waste water containing a synthetic resin emulsion to coagulate the synthetic resin emulsion in the waste water. The coagulant effectively used in the invention may include inorganic coagulants such as polyaluminum chloride, aluminum sulfate, iron chloride, iron sulfate and the like, and organic coagulants such as polyacrylic acid salts, polyacrylamide, alginic acid salts, polyethylene imine and the like. Said organic coagulant may also be used with said inorganic coagulant together. Desirable coagulant for the invention includes inorganic aluminum compound such as polyaluminum chloride and aluminum sulfate. When said inorganic aluminum compound is used as coagulant, the coagulated synthetic resin emulsion does not be coloured since said inorganic aluminum compound is almost white, and such non-coloured coagulation may be advantageously re-used. On the other hand, when iron salt is used as coagulant, coloured coagulation is obtained. The coagulant is generally added to the waste water containing the synthetic resin emulsion in the range of 0.03 to 0.1% by weight in case that the inorganic coagulant is used alone, and when the organic coagulant is used in combination with the inorganic coagulant, the inorganic coagulant is generally used in the range of 0.01% to 0.03% by weight and the organic coagulant is generally used in the range of 5 to 20 ppm. Since the inorganic salt such as polyaluminum chloride and the like acts as the coagulant in the form of hydroxide, it is desirable that pH value of the waste water is adjusted approximately 6 to 8.

The coagulating process of the synthetic resin emulsion is generally carried out in a tank attaching a stirrer. After the coagulant is added to the waste water containing the synthetic resin emulsion and the waste water is adjusted properly in a fixed pH value, the stirrer is actuated to dissolve the coagulant in the waste water and then is stopped. Means for accelerating coagulation such as aeration, heating and the like may be optionally employed.

In the second step, the synthetic resin emulsion coagulated in the first step is separated. The separation of the coagulated emulsion is effected by using an ordinary solid-liquid separation method such as filtration of centrifugation. The coagulation thus separated from the waste water contains solids approximately in the range of 20 to 25%.

In the third step, the coagulation separated in the second step is re-dispersed in medium such as water or another synthetic resin emulsion. In case that said redispersing solution is used as treating solution for such as textile finishing and the like, water may be generally used as medium since small amount of synthetic resin content, such as a few percents by weight, is applicable for such use.

On the other hand, in case that said re-dispersing solution is used as synthetic resin emulsion itself, another synthetic resin emulsion may be generally used as medium to obtain large amount of synthetic resin content. Water soluble polymer is used as dispersant for redispersing the coagulation.

Said water-soluble polymer may include every kind of synthetic and natural water-soluble polymer such as polyacrylic acid salts, polymethacrylic acid salts, polyacrylic amide, alginic acid salts, carboxymethyl cellulose, water-soluble rubber, proteins, and the like. Particularly, when another synthetic resin emulsion is used as medium, polyacrylic acid salt and/or polymethacrylic acid salt is preferably used as dispersant since they can be added to the synthetic resin emulsion without remarkably increasing viscosity of the re-dispersing solution. Water-soluble polymer is added approximately in an amount of 0.5 to 3% by weight based on water or the another synthetic resin emulsion. The resultant coagulation are added approximately in an amount of 2 to 3% in the case of water or 0.5 to 2% in the case of the another synthetic resin emulsion. When the coagulation is re-dispersed in the water or another synthetic resin emulsion, a fixed amount of the water-soluble polymer is firstly dissolved in the water or the synthetic resin emulsion, thereafter the coagulation is added to the resultant solution and then the resultant mixture is stirred completely to redisperse the coagulation. Another synthetic resin emulsion used advantageously as medium of the invention may include every kind of emulsion of synthetic resin and latex of rubber as above mentioned in the first step and it is desirable to select synthetic resin emulsion having high or solid content. High solid content grade of the commercial synthetic resin emulsion may contain about 60% by weight of solid content. It is also allowable to dilute the synthetic resin emulsion by water and the like.

As above mentioned, the coagulation separated from the waste water containing the synthetic resin emulsion is thus far re-dispersed in water or another synthetic resin emulsion by using water-soluble polymer as dispersant and resultant dispersing solution can be advantageously re-used as adhesive, textile finishing agent, paint and the like.

EXAMPLE

The waste water exhausted from a plant for the manufacture of a polyacrylic ester emulsion contains said emulsion component within the range of from 0.1 to 1% by weight. The waste water is put in a coagulating tank attaching a stirrer, and 0.2% of an aqueous 10% polyaluminum chloride solution and 1% of an aqueous 0.1% polyacryl amide solution are added thereto. The waste water is then agitated by the stirrer to dissolve therein the polyaluminum chloride and polyacryl amide. Subsequently, pH value of the resultant solution is adjusted by addition of an aqueous 20% caustic soda solution within the range of 5 to 8, preferably 6 to 7. After pH value is adjusted, the agitation is stopped. When the solution is allowed to keep without agitation for two hours, the emulsion component contained in the waste water is coagulated.

Figure 2:
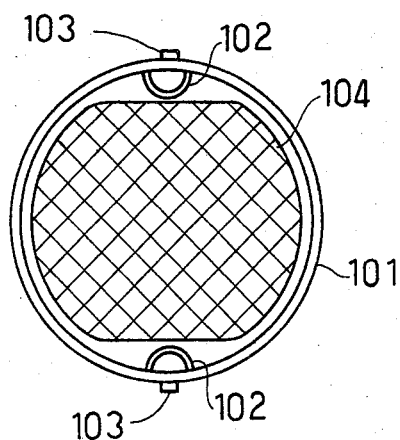
FIG. 2 is a plan view of said separator.

Illustrated in FIGS. 1 and 2 is a preferred embodiment of the separator for separating the coagulation.

Referring now to Figures, a pair of supporting poles 102 are arranged oppositely on the inner wall of the vessel 101. Said supporting poles are obtained such as by dividing a pipe made of a plastic such as polyvinyl chloride and the like into two equal halves in the axial direction. A vent 103 for discharging water is opened at the bottom of the vessel 101. If desired, two or more vents may preferably be opened. A filter bag 104 is put in the vessel 101 and said filter bag is preferably made of a elastic net. When the waste water treated in the coagulating tank is introduced into said filter bag 104 in the vessel 101, water is separated from the coagulation and said separated water flows out of the filter bag 104 and stays at the bottom part of the vessel 101 to be discharged through the vent 103. Said water discharged from the vessel 101 is clear so that it can be exhausted after filtration using the active carbon layer as a filter without any trouble. When the coagulation has been filled up in the vessel 101, supplying the waste water treated is discontinued and then the coagulation is kept in the vessel 101 for one or two hours to remove the water remaining in the coagulation. Consequently, the coagulation containing 20 to 25% of solid is obtained.

A polyacrylic ester emulsion, E-358 (a commercial product of Rohm and Haas Company) having 60% by weight of solid content is used as a new synthetic resin emulsion and 0.5% by weight of a polymethacrylic acid salt, Primal #850 (a commercial product of Rohm and Haas Company) is added to said emulsion. Said polymethacrylic acid salt is dissolved in said emulsion by agitation. 50% by weight of said coagulation is added to the resultant solution and the resultant mixture is well agitated. Thus the coagulation is redispersed to obtain a homogeneous emulsion. Said emulsion has 40% of solid content and 1000 cps at 25° C. of viscosity, and is advantageously used as a textile finishing agent.

We claim:

1. A method for recovering synthetic resin emulsion which comprisies; adding coagulant to waste water containing synthetic resin emulsion to coagulate said synthetic resin emulsion, separating the coagulation of said synthetic resin emulsion from said waste water, and redispersing said separated coagulation in synthetic resin emulsion medium by using water-soluble polymer as dispersant.

2. The method for recovering synthetic resin emulsion in accordance with claim 1, wherein said coagulant is inorganic aluminum compound.

3. The method for recovering synthetic resin emulsion in accordance with claim 1, wherein said water-soluble polymer is polyacrylic acid salt and/or polymethacrylic acid salt.

* * * * *